United States Patent
Barnes et al.

(10) Patent No.: US 7,707,836 B1
(45) Date of Patent: *May 4, 2010

(54) VENTURI COOLING SYSTEM

(75) Inventors: John Barnes, Niskayuna, NY (US);
Adam Bailey, Albany, NY (US); John Battaglioli, Ballston Lake, NY (US);
Robert Bland, Oviedo, FL (US)

(73) Assignee: Gas Turbine Efficiency Sweden AB (SE)

( * ) Notice: Subject to any disclaimer, the term of this patent is extended or adjusted under 35 U.S.C. 154(b) by 0 days.

This patent is subject to a terminal disclaimer.

(21) Appl. No.: 12/536,861

(22) Filed: Aug. 6, 2009

Related U.S. Application Data

(63) Continuation of application No. 12/357,029, filed on Jan. 21, 2009.

(51) Int. Cl.
*F23R 3/42* (2006.01)
(52) U.S. Cl. .................... 60/755; 60/757; 60/758
(58) Field of Classification Search .......... 60/755, 60/757, 758
See application file for complete search history.

(56) References Cited

U.S. PATENT DOCUMENTS

| | | | |
|---|---|---|---|
| 2,935,841 A * | 5/1960 | Myers et al. ............ 60/266 |
| 3,656,303 A | 4/1972 | La Force | |
| 3,904,307 A | 9/1975 | Dennison | |
| 4,010,607 A | 3/1977 | Hopping | |
| T962,010 I4 | 9/1977 | Newbury et al. | |
| 4,200,124 A | 4/1980 | Stratynski et al. | |
| 4,231,221 A | 11/1980 | Mathner et al. | |
| 4,250,856 A | 2/1981 | Abbey | |
| 4,292,801 A | 10/1981 | Wilkes et al. | |
| 4,303,374 A | 12/1981 | Braddy | |
| 4,361,010 A * | 11/1982 | Tanrikut et al. ............ 60/757 |
| 4,413,477 A * | 11/1983 | Dean et al. ............ 60/757 |
| 4,420,929 A | 12/1983 | Jorgensen | |
| 4,690,245 A | 9/1987 | Gregorich et al. | |
| 4,719,748 A | 1/1988 | Davis, Jr. et al. | |
| 4,984,429 A | 1/1991 | Waslo et al. | |
| 5,101,624 A | 4/1992 | Nash et al. | |
| 5,117,636 A | 6/1992 | Bechtel | |
| 5,123,248 A | 6/1992 | Monty et al. | |

(Continued)

OTHER PUBLICATIONS

"Experimental and Theoretical Studies of a Novel Venturi Lean Premixed Prevaporized (LLP) Combustor," N.A. Rokke and J.W. Wilson, J. Eng. Gas Turbines Power, vol. 123, Issue 3, Oct. 2000.

(Continued)

*Primary Examiner*—Ted Kim
(74) *Attorney, Agent, or Firm*—DLA Piper LLP (US)

(57) ABSTRACT

A combustor for a gas turbine is provided having a nozzle assembly located at one end and a combustion chamber defining a second end of the combustor. A venturi is positioned within the combustor, between the nozzle and the combustion chamber. The venturi defines an internal passageway therein having a first side facing the nozzle and a second side facing the combustion chamber. Compressed air is directed into an inlet in fluid communication with the first and second sides of the internal passageway. The internal passageway directs the compressed air from the inlet in opposite directions within the first and second sides of the internal passageway for cooling the venturi.

15 Claims, 3 Drawing Sheets

U.S. PATENT DOCUMENTS

| | | | |
|---|---|---|---|
| 5,125,227 A | 6/1992 | Ford | |
| 5,127,221 A | 7/1992 | Beebe | |
| 5,253,478 A | 10/1993 | Thibault | |
| 5,257,499 A | 11/1993 | Leonard | |
| 5,285,631 A | 2/1994 | Bechtel, II et al. | |
| 5,329,773 A | 7/1994 | Myers et al. | |
| 5,454,221 A | 10/1995 | Loprinzo | |
| 5,481,866 A | 1/1996 | Mowill | |
| 5,487,275 A | 1/1996 | Borkowicz et al. | |
| 5,575,146 A | 11/1996 | Borkowicz et al. | |
| 5,575,154 A | 11/1996 | Loprinzo | |
| 5,584,651 A | 12/1996 | Pietraszkiewicz et al. | |
| 5,612,006 A | 3/1997 | Fisk | |
| 5,738,493 A | 4/1998 | Lee et al. | |
| 5,787,703 A | 8/1998 | Fougerouse | |
| 5,802,841 A | 9/1998 | Maeda | |
| 5,829,245 A | 11/1998 | McQuigaan et al. | |
| 5,896,742 A | 4/1999 | Black | |
| 5,950,417 A | 9/1999 | Robertson, Jr. et al. | 60/39.06 |
| 6,037,684 A | 3/2000 | DeYoung et al. | |
| 6,139,257 A | 10/2000 | Proctor et al. | |
| 6,209,325 B1 | 4/2001 | Alkabie | |
| 6,250,066 B1 | 6/2001 | Lawrence et al. | |
| 6,267,106 B1 | 7/2001 | Feucht | |
| 6,282,905 B1 | 9/2001 | Sato et al. | 60/752 |
| 6,357,999 B1 | 3/2002 | Pearce et al. | |
| 6,374,594 B1 | 4/2002 | Kraft | |
| 6,408,628 B1 | 6/2002 | Pidcock et al. | 60/752 |
| 6,427,446 B1 | 8/2002 | Kraft et al. | |
| 6,430,932 B1 | 8/2002 | Martling | |
| 6,446,438 B1 | 9/2002 | Kraft | |
| 6,484,509 B2 | 11/2002 | Kraft | |
| 6,536,201 B2 | 3/2003 | Stuttaford et al. | |
| 6,623,160 B2 | 9/2003 | McCarthy, Jr. | |
| 6,625,989 B2 | 9/2003 | Boeck | |
| 6,672,570 B2 | 1/2004 | Takano et al. | |
| 6,675,581 B1 | 1/2004 | Stuttaford et al. | |
| 6,691,516 B2 | 2/2004 | Stuttaford et al. | |
| 6,698,924 B2 | 3/2004 | McCarthy, Jr. et al. | |
| 6,705,088 B2 | 3/2004 | Martling | |
| 6,722,595 B1 | 4/2004 | Frick et al. | |
| 6,772,595 B2 | 8/2004 | Martling et al. | |
| 6,799,427 B2 | 10/2004 | Calvez et al. | |
| 6,832,482 B2 | 12/2004 | Martling | |
| 6,865,892 B2 * | 3/2005 | Garrido et al. | 60/798 |
| 6,881,378 B1 | 4/2005 | Zimmer et al. | |
| 6,898,937 B2 | 5/2005 | Stuttaford et al. | |
| 6,912,838 B2 | 7/2005 | Sileo | |
| 6,925,809 B2 | 8/2005 | Mowill | |
| 6,935,116 B2 | 8/2005 | Stuttaford et al. | |
| 6,951,109 B2 | 10/2005 | Lemon et al. | |
| 6,969,230 B2 | 11/2005 | Shi et al. | |
| 6,981,846 B2 | 1/2006 | Liang | |
| 6,983,600 B1 | 1/2006 | Dinu et al. | |
| 6,986,254 B2 | 1/2006 | Stuttaford et al. | |
| 7,003,958 B2 | 2/2006 | Dinu et al. | |
| 7,007,482 B2 | 3/2006 | Green | |
| 7,013,649 B2 | 3/2006 | Monty | |
| 7,021,892 B2 | 4/2006 | Sidwell et al. | |
| 7,051,524 B1 | 5/2006 | Kraft | |
| 7,082,770 B2 | 8/2006 | Martling et al. | |
| 7,096,668 B2 | 8/2006 | Martling et al. | |
| 7,127,899 B2 | 10/2006 | Sprouse et al. | |
| 7,152,410 B2 | 12/2006 | Sheoran et al. | |
| 7,153,488 B2 | 12/2006 | Messett et al. | |
| 7,237,384 B2 | 7/2007 | Stuttaford et al. | |
| 7,290,394 B2 | 11/2007 | Lehtinen | |
| 7,373,773 B2 | 5/2008 | Noda | |
| 7,386,980 B2 | 6/2008 | Green et al. | |
| 7,389,643 B2 | 6/2008 | Simens et al. | |
| 7,409,832 B2 | 8/2008 | Nakano et al. | |
| 7,412,831 B2 | 8/2008 | Ullyott | |
| 7,451,600 B2 | 11/2008 | Patel et al. | |
| 7,513,115 B2 | 4/2009 | Stuttaford | |
| 7,546,737 B2 | 6/2009 | Schumacher et al. | |
| 2006/0168966 A1 | 8/2006 | Stuttaford et al. | |
| 2006/0168967 A1 * | 8/2006 | Simons et al. | 60/752 |
| 2007/0062002 A1 | 3/2007 | Lin | |
| 2007/0062202 A1 | 3/2007 | Stastny et al. | |
| 2007/0163264 A1 | 7/2007 | Diaz et al. | |
| 2007/0180834 A1 | 8/2007 | Caboche et al. | |
| 2007/0199325 A1 | 8/2007 | Tanimura et al. | |
| 2007/0234727 A1 | 10/2007 | Patel et al. | |
| 2007/0256417 A1 | 11/2007 | Parker | |
| 2007/0261399 A1 | 11/2007 | Mallampalli et al. | |
| 2008/0019828 A1 | 1/2008 | Commaret et al. | |
| 2008/0053103 A1 | 3/2008 | Stastny | |
| 2008/0060360 A1 | 3/2008 | Stastny | |
| 2008/0187435 A1 | 8/2008 | Farah et al. | |
| 2009/0019854 A1 | 1/2009 | Simons et al. | |

OTHER PUBLICATIONS

"Emissions Impossible," Jeffrey Benoit, PSM USA, Nov. 2008.

* cited by examiner

VENTURI COOLING SYSTEM

CROSS-REFERENCE TO RELATED APPLICATION

This application is a Continuation of pending U.S. patent application Ser. No. 12/357,029, filed on Jan. 21, 2009.

TECHNICAL FIELD

The present invention relates to combustors that may be used in combustion turbines. More specifically, the present invention relates to a system for cooling the venturi throat region between the primary and secondary combustion chambers.

BACKGROUND

Gas turbines play a significant role in a number of applications, such as aircraft propulsion, marine propulsion, power generation and driving processes, such as pumps and compressors. Typically, a gas turbine includes a compressor, a combustor and a turbine. In operation, air is fed into the system where it is compressed by the compressor and mixed with fuel in the combustor. The compressed air and fuel mixture are then burned within the combustor to cause an expansion of the air flow, which is responsible for driving the turbine.

Combustion liners define the interior volume of the combustor and serve to protect the combustor casing and remaining engine parts from the extreme temperatures present within the combustor. In order to reduce $NO_x$ emissions and extend the longevity of engine components, it is desirable to use a portion of the compressed air exiting the compressor for cooling various combustor components, including the combustion liner.

Combustion liners often include a venturi throat region that is used to influence the flame location within the combustor and to stabilize the combustion flame. In such arrangements, a lowering of the $NO_x$ emissions is achieved by lowering peak flame temperatures through the burning of a lean, uniform mixture of fuel and air. Uniformity is typically achieved by pre-mixing fuel and air in the combustor upstream of the venturi and then firing the mixture downstream of the edge or apex of the venturi into the secondary combustion chamber. The venturi configuration, by virtue of accelerating the flow preceding the throat portion, is intended to keep the flame from flashing back into the pre-mixing region or primary combustion chamber, upstream of the venturi throat. The flame holding region, upstream of the venturi, is also required to be cooled under certain operating conditions. Since flames can reside on each side of the venturi, both sides need to be cooled. However, if the flow of cooling air released downstream of the venturi is too large or is released too close to the venturi, it may adversely affect combustion performance.

U.S. Pat. No. 5,117,636 shows a cooling passageway within the venturi that is extended downstream from the venturi apex or throat, such that the cooling air does not re-enter the flame holding zone within the secondary combustion chamber. It is intended that the functions of flame holding and venturi cooling are decoupled. U.S. Pat. No. 6,430,932 shows a cooling chamber within a venturi that directs the cooling flow counter to the combustion flow and dumps cooling air upstream of the venturi.

It has been determined that the heat load on the upstream and downstream sides of the venturi are different and the dumping of cooling air near the venturi on either side has an effect on the operation of the combustor. In the prior designs, where the cooling of both sides of the venturi are linked, there has not been a balancing of the heat pickup within the venturi walls nor has there been an accommodation made for pressure drop within the cooling passageway.

SUMMARY OF THE INVENTION

A combustor is provided for a gas turbine engine of the type having a nozzle assembly located at a first end of the combustor and a combustion chamber defined at a second end of the combustor, downstream of the nozzle. A venturi is positioned between the nozzle and the combustion chamber. The venturi defines a transition between the first end of the combustor and the second end of the combustor. The venturi includes a passageway therein for receipt of a cooling air flow. The passageway has a first side facing the nozzle and a second side facing the combustion chamber. A compressed air source is directed into the passageway with the flow inlet being in communication with both the first and second sides of the venturi passageway. The venturi passageway directs compressed air from the source in opposite directions within the venturi. Thus, the air flow in the first side and second side of the passageway are in opposite directions.

A further aspect of the invention may include a secondary passageway that extends upstream of the second side of the venturi passageway. Further, the cooling flow inlet may be positioned closer to the nozzle or closer to the upstream side of the venturi apex.

BRIEF DESCRIPTION OF THE DRAWINGS

In the drawings, there is illustrated a number of embodiments which are presently preferred.

DETAILED DESCRIPTION

Figure 1:
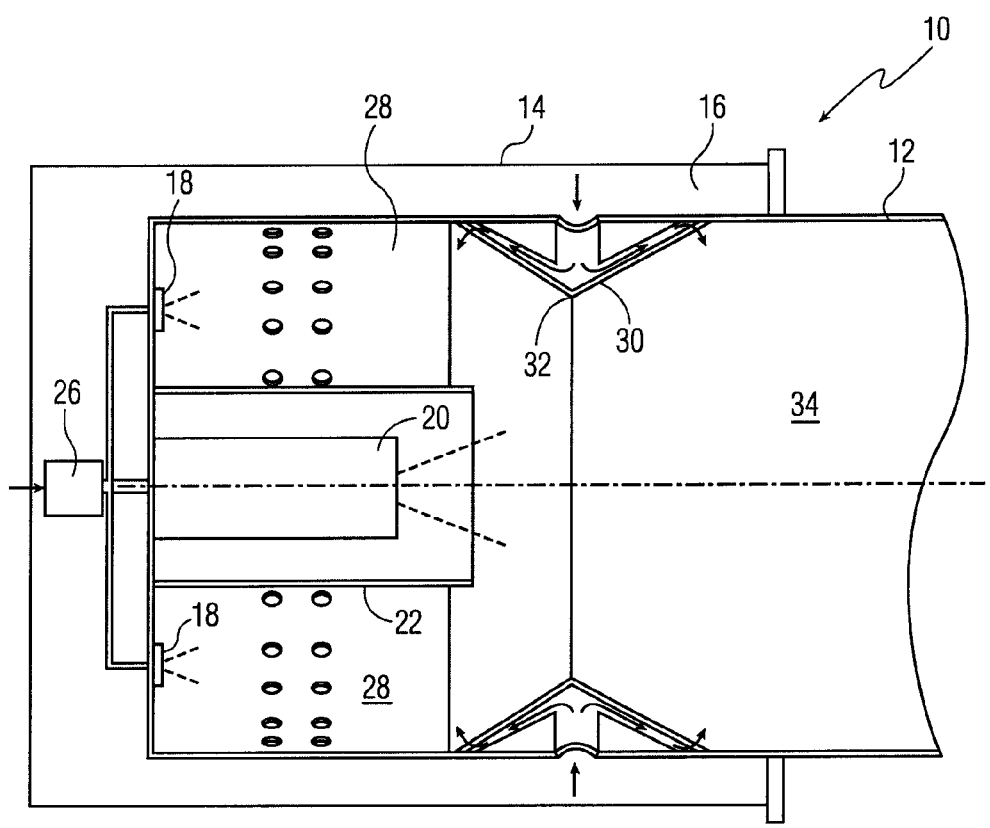
FIG. 1 shows a simplified cross-section of a gas turbine combustion system incorporating an embodiment of the present invention.

In the drawings, there is shown a graphical representation of a typical combustor and a number of embodiments of the present invention. The combustor is generally designated by the numeral 10 and is contemplated to be incorporated into a gas turbine (not shown). In FIG. 1, the combustor 10 includes a combustion liner 12 that is at least partially surrounded by a heat shield or flow sleeve 14. Compressed air is provided from an upstream compressor (not shown) and fed into a surrounding channel 16 formed between the heat shield 14 and combustion liner 12.

Within the confines of the combustion liner 12 are provided a plurality of primary fuel nozzles 18 and a secondary fuel nozzle 20. A combustor flow sleeve 22 is provided surrounding the secondary fuel nozzle 20, separating the secondary nozzle 20 from the primary nozzles 18. Fuel 24 is introduced into a controller 26 and fed to the nozzles 18, 20. The area between the combustion liner 12 and combustor flow sleeve 22 defines an upstream or primary combustion chamber 28. Downstream of the secondary nozzle 20 is a venturi 30 defining an annular restriction within the area defined by the combustion liner 12. The venturi 30 includes an apex 32 that defines a venturi throat portion. The apex 32 is positioned downstream of the nozzles 18, 20. A downstream or secondary combustion chamber 34 is positioned within the combustor downstream of the venturi apex 32.

In operation, a flame can reside on either side of the venturi 30, both in the upstream combustion chamber 28 and the downstream combustion chamber 34. In a primary operation, fuel 24 is provided to the primary nozzles 18, with combustion occurring in the upstream combustion chamber 28 and directed downstream through the venturi throat 32. In a lean-lean operation, fuel 24 is provided to the primary nozzles 18 as well as to the secondary nozzle 20. Combustion occurs in both the upstream combustion chamber 28 as well as the downstream combustion chamber 34. In addition, the combustor 10 may operate with fuel 24 directed solely to the secondary nozzle 20, creating combustion in the downstream combustion chamber 34. Additional fuel 24 may be provided to the primary nozzles 18 without flame being created in the upstream combustion chamber 28. The fuel and air pre-mix passing through the upstream chamber 28 is directed by the venturi 30 into the downstream combustion chamber 34 creating a pre-mix operation and a significant flame within the downstream chamber 34.

Since flames can reside on either side of the venturi 30, both sides of the walls of the venturi typically need to be cooled for proper operation and for longevity of the equipment. As shown in FIG. 1, cooling air in the surrounding channel 16 is directed on to the rear side of the venturi 30 and then directed along the inside walls of the venturi 30. The heat load on the upstream and downstream sides of the venturi 30 are contemplated to be different. In addition, movement of the cooling air back into the combustion chambers on either side of the venturi 30 also has an affect on operation of the combustor 10.

Figure 2:
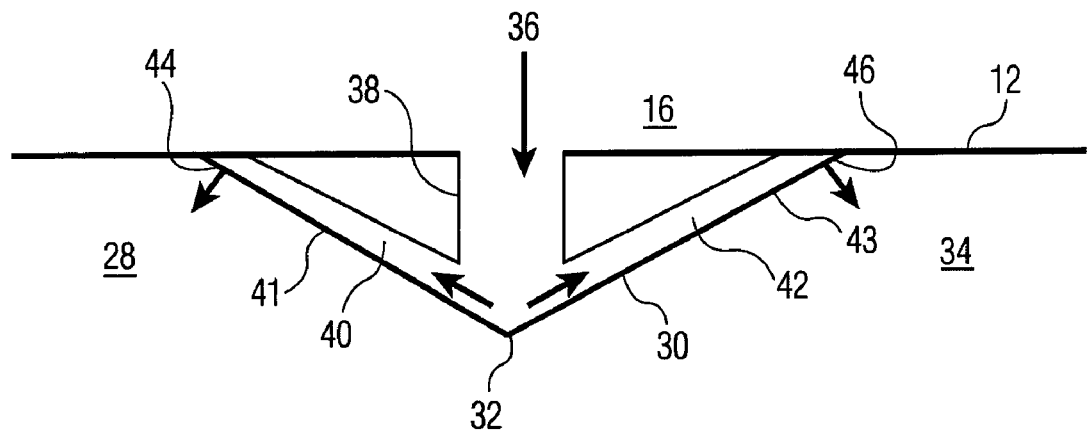
FIG. 2 is a partial cross-sectional view of the venturi throat region of the combustion system illustrated in FIG. 1.
Figure 3:
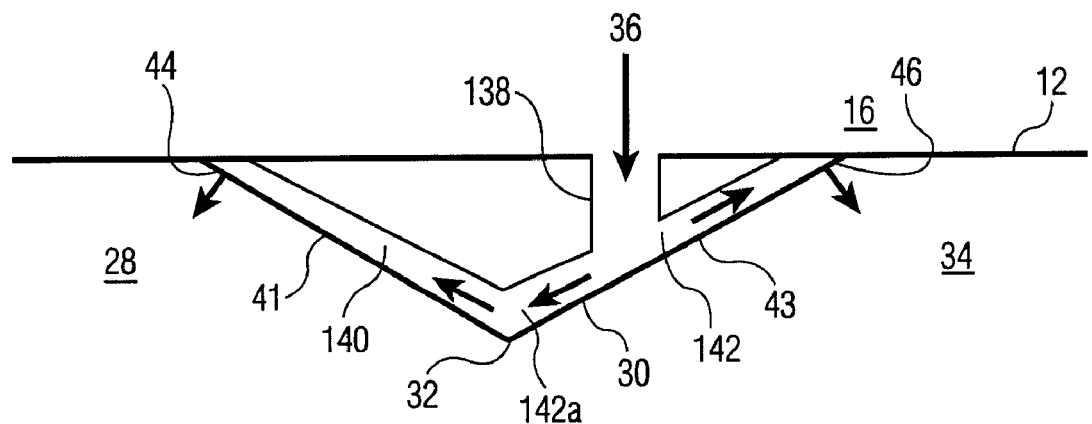
FIG. 3 is a partial cross-sectional view of a further embodiment of a venturi system for use in a combustion system.

In FIG. 2, there is shown an enlarged schematic cross-sectional view of one side of the venturi 30 illustrated in FIG. 1. Compressed air 36 is directed into a plenum 38 on the back side of the venturi 30. In this embodiment, the inlet plenum 38 is positioned directly behind the apex 32 of the venturi 30. The cooling air is directed substantially perpendicular to a horizontal ground plane and is directed to the venturi 30 by the inlet plenum 38, which is in fluid communication with two channels 40 and 42 that are generally parallel to a first or upstream side 41 of the venturi 30 and a second or downstream side 43 of the venturi 30. As shown in FIGS. 2 and 3, sides 41, 43 are preferably not perpendicular to liner 12 but are angled with respect thereto. The cooling air 36 directed into the channel 40 is turned in an opposite direction from the cooling air directed into the channel 42. The air flow along the upstream channel 40 on the upstream side 41 of the venturi 30 is directed through an upstream exit 44 and into the primary combustion chamber 28. The cooling flow passing through the downstream channel 42 and along the downstream side 43 is directed through downstream exit 46, positioned adjacent the combustion liner 12, and into the downstream combustion chamber 34. As shown, preferably, upstream exit 44 and downstream exit 46 are at the respective ends of sides 41, 43 and may be adjacent liner 12. In addition, the upstream exit and downstream exit may be at a distal end with respect to the apex. As also shown, the air that exits from upstream exit 44 may be directed towards the first end of the chamber and the air that exits from downstream exit 46 may be directed towards the second end of the chamber. A number of specific forms of exhaust exits for the venturi air are known in the prior art and may be incorporated into the venturi 30 as presently described.

In FIG. 3, a variation of the structures of the invention is shown. The cooling air 36 is directed from the channel 16 into an inlet plenum 138 having an outlet that is positioned adjacent the downstream side 43 of the venturi 30. The inlet plenum 138 is in direct fluid communication with the downstream channel 142. Cooling air is directed in a downstream direction through the channel 142, towards the downstream exit 46. An additional flow of cooling air is directed within the downstream channel portion 142a in the opposite direction from the downstream exit 46. Cooling channel portion 142a communicates with upstream channel 140, positioned behind the upstream side 41 of the venturi 30. The cooling air within the upstream channel 140 is directed through the upstream exit 44 and into the upstream combustion chamber 28. Positioning the cooling channel on the downstream face of the venturi reduces the cooling required for the downstream portion of the venturi. Alternatively, the inlet plenum 138 may be positioned adjacent the upstream side 41 of the venturi 30.

Thus, the venturi defines a transition between the first and second ends of the combustor. The internal passageway within the venturi includes a first side and a second side on opposite sides of an apex of the venturi. The cooling inlet for the compressed air flow is in fluid communication with the first and second sides of the venturi passageway and the compressed air from the cooling inlet is directed through the venturi passageway in opposite directions within the first side and second side. The cooling inlet may communicate with the venturi passageway at a position in line with or offset from the apex of the venturi. The cooling inlet may be formed as a radial plenum positioned behind the venturi or may take any number of other forms.

Figure 4:
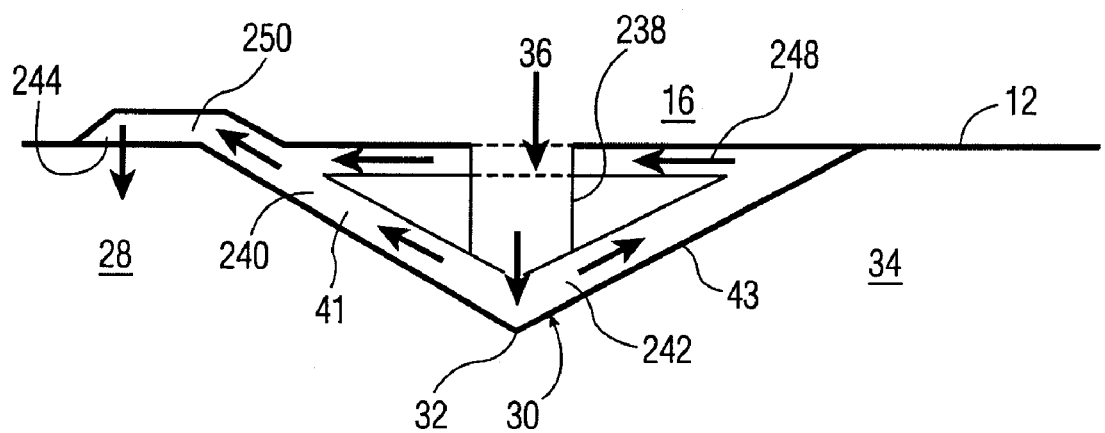
FIG. 4 is a partial cross-sectional view of still a further embodiment of a venturi system for use in a combustion system.

In FIG. 4, a further embodiment of a venturi cooling system is provided. The cooling air 36 is directed from the channel 16 into an inlet plenum 238. The inlet plenum 238 directs the cooling air into the channels 240, 242 on the rear side of the venturi 30. As illustrated, the inlet plenum 238 is positioned adjacent the rear of the apex 32 of the venturi 30, with the second passageway or upstream channel 240 directing cooling air along the upstream side 41 and the first passageway or downstream channel 242 directing cooling air along the downstream side 43. The downstream end of channel 242 is in fluid communication with a liner or secondary passageway 248. The cooling air within the channel 242 reverses in direction as it enters the secondary passageway 248. The secondary passageway 248 extends towards the upstream side of the combustor and joins with the upstream channel 240, adjacent an exhaust channel 250. The combined flow from the upstream channel 240 and secondary passageway 248 passes through the exhaust channel 250 and is exhausted through the upstream exit 244 into the combustion chamber 28 on the upstream side of the venturi 30. As shown in FIG. 4, the cooling air exit may be positioned upstream of the first side of the venturi.

In the embodiment shown in FIG. 4 (and in the embodiments described above), it is contemplated that inlet plenum 238 may comprise something other than a continuous slot or annular channel. The inlet plenum 238 and secondary passageway 248 may be formed by a series of pipes that cross over one another. Thus, the inlet plenum 238 feeds the back side of the venturi 30 after crossing over the series of pipes that form the passageway 248. Repositioning of the inlet plenum 238 with respect to the axial position of the apex 32 of the venturi 30 may also be utilized to adjust the cooling effect on the venturi 30. In addition, as in all of the embodiments discussed herein, the relative size and formation of the channels and passageways may be varied so as to adjust the air flow and pressure drop of the cooling air as it moves inside the venturi walls and is then directed into the combustion chambers.

A variety of modifications to the embodiments described will be apparent to those skilled in the art upon review of the present disclosure. Thus, the invention may be embodied in other specific forms without departing from the spirit or essential attributes thereof and, accordingly, reference should be made to the appended claims, rather than to the foregoing specification, as indicating the scope of the invention.

What is claimed is:

1. A combustor for a gas turbine comprising:
   a nozzle assembly located at a first end of the combustor;
   a combustion chamber defined within the combustor, downstream of the nozzle assembly;
   a venturi positioned within the combustor and defining a transition between the first end and the combustion chamber, the venturi having an internal passageway therein, the internal passageway having a first portion extending towards the first end and a second portion extending towards the combustion chamber;
   a compressed air source directed into a cooling inlet, the cooling inlet in fluid communication with the first and second portions of the internal passageway,
   the internal passageway directing the compressed air from the source in opposite directions along the first portion and second portion for cooling the venturi; and
   a secondary passageway communicating with a downstream end of the second portion of the internal passageway, wherein the air flow moving through the second portion of the internal passageway into the secondary passageway is reversed in direction and directed towards the first end of the combustor.

2. The combustor of claim 1, further comprising a cooling air exit positioned at an end of the first portion of the internal passageway for directing the cooling air into the first end of the combustor.

3. The combustor of claim 2, wherein the secondary passageway and the first portion of the internal passageway are each in fluid communication with the cooling air exit.

4. The combustor of claim 3 wherein the cooling air exit directs the air flow from the secondary passageway and the first portion of the internal passageway into the first end of the combustor, upstream of the venturi.

5. The combustor of claim 4, wherein the cooling air exit is positioned upstream of the first portion of the venturi.

6. The combustor of claim 1, further comprising a radial plenum positioned behind the venturi and fluidly connecting the first and second portions of the internal passageway with the compressed air source.

7. A combustor for a gas turbine comprising:
   a nozzle assembly located at a first end of the combustor;
   a combustion chamber defined within the combustor, downstream of the nozzle assembly;
   a venturi positioned within the combustor and defining a transition between the first end and the combustion chamber, the venturi having an internal passageway therein, the internal passageway having first and second portions on opposing sides of an apex of the venturi;
   a cooling inlet for a compressed air flow, the cooling inlet in fluid communication with the first and second portions of the internal passageway, and the compressed air from the cooling inlet is directed within the internal passageway in opposite directions within the first and second portions for cooling the venturi; and
   a secondary passageway communicating with a downstream end of the second portion of the internal passageway, wherein the air flow moving through the second portion of the internal passageway into the secondary passageway is reversed in direction and directed towards the first end of the combustor.

8. The combustor of claim 7, wherein the cooling inlet communicates with either the first or second portion of the internal passageway at a position offset from the apex of the venturi within the combustor.

9. The combustor of claim 7, wherein the cooling inlet comprises a radial plenum positioned behind the venturi.

10. The combustor of claim 7, further comprising a cooling air exit positioned at an end of the first portion of the internal passageway for directing the cooling air into the first end of the combustor.

11. The combustor of claim 10, wherein the secondary passageway and the first portion of the passageway are each in fluid communication with the cooling air exit.

12. The combustor of claim 1, wherein the cooling air exit directs the air flow from the secondary passageway and the first portion of the internal passageway into the first end of the combustor, upstream of the venturi.

13. A venturi within a gas turbine combustor comprising:
   an upstream angled side, a downstream angled side, an apex positioned between the upstream and downstream sides and a cooling air inlet between angled sides for supplying cooling air proximate the apex;
   a first passageway directing cooling air from the inlet along an inner surface of the downstream angled side and then reversed in direction upstream thereof along a liner;
   a second passageway directing cooling air from the inlet along the upstream angled side; and
   a cooling discharge directing cooling air from the second passageway into the combustor, upstream of the apex of the venturi.

14. The venturi of claim 13, further comprising a central plenum extending radially around the combustor, within the venturi, and being fluidly connected to the first and second passageways.

15. The venturi of claim 13, wherein the cooling discharge is positioned upstream of the upstream angled side of the venturi.

* * * * *